United States Patent [19]

Sahara et al.

[11] Patent Number: 4,805,014

[45] Date of Patent: Feb. 14, 1989

[54] SIGNAL TRANSMISSION SYSTEM FOR A CATV SYSTEM

[75] Inventors: Hiroshi Sahara; Yoshimi Watanabe, both of Kanagawa, Japan

[73] Assignee: Sony Corporation, Tokyo, Japan

[21] Appl. No.: 96,773

[22] Filed: Sep. 14, 1987

Related U.S. Application Data

[63] Continuation of Ser. No. 667,737, Nov. 2, 1984, abandoned.

[30] Foreign Application Priority Data

Nov. 7, 1983 [JP] Japan .............................. 58-208741
Nov. 8, 1983 [JP] Japan .............................. 58-209488

[51] Int. Cl.⁴ .............................................. H04N 7/10
[52] U.S. Cl. ................................................... 358/86
[58] Field of Search .................... 358/86, 143, 144; 455/3, 6

[56] References Cited

U.S. PATENT DOCUMENTS

| | | | |
|---|---|---|---|
| 3,757,225 | 9/1973 | Ulicki | 358/86 |
| 3,988,528 | 10/1976 | Yanagimachi et al. | 358/143 |
| 4,215,370 | 7/1980 | Kirk, Jr. | |
| 4,513,315 | 4/1985 | Dekker et al. | 358/86 |
| 4,656,629 | 4/1987 | Kondoh et al. | 358/86 X |

FOREIGN PATENT DOCUMENTS

| | | | |
|---|---|---|---|
| 144770 | 5/1985 | European Pat. Off. | 358/86 |
| 55-141874 | 11/1980 | Japan | 358/86 |
| 59-15388 | 1/1984 | Japan | 358/86 |
| 59-15387 | 1/1984 | Japan | 358/86 |
| 2038147 | 7/1980 | United Kingdom | |
| 2110034 | 6/1983 | United Kingdom | 358/86 |

OTHER PUBLICATIONS

Nachrichtentechnische Zeitschriftntz, Jun. 1983, pp. 364–370.
Funkschau, Sep. 1974, pp. 689–692.

*Primary Examiner*—Keith E. George
*Attorney, Agent, or Firm*—Lewis H. Eslinger; Jay H. Maioli; Donald S. Dowden

[57] ABSTRACT

A CATV (cable television) signal transmitting system for use with a broadcast satellite system includes a receiving stage for receiving a broadcast satellite station signal consisting of base-band video signals and a sub-channel digital audio signals PSK (phase shift keying)-modulated on sub-carriers, demodulators for deriving the video signals and digital audio signals, first modulators for modulating the main carriers of a plurality of CATV channels by the video signals, a second modulator for modulating the main carrier of a different channel by the digital audio signals in time-division manner. The mixed output signal from the first and second modulators is transmitted through a CATV transmission line. A CATV signal receiving system is also provided to produce video signals and digital audio signals which are converted into a plurality of channels of analog audio signals.

6 Claims, 4 Drawing Sheets

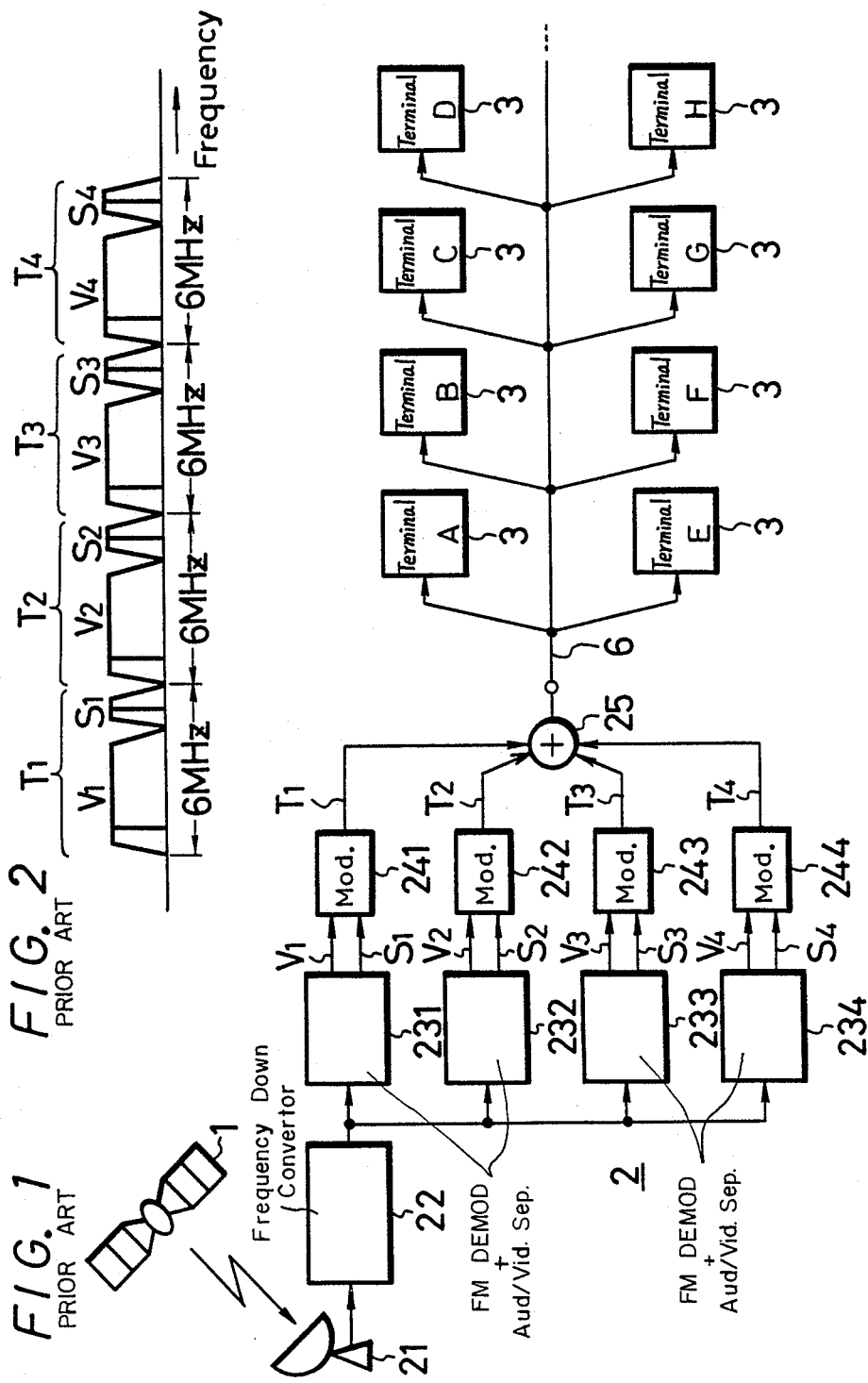

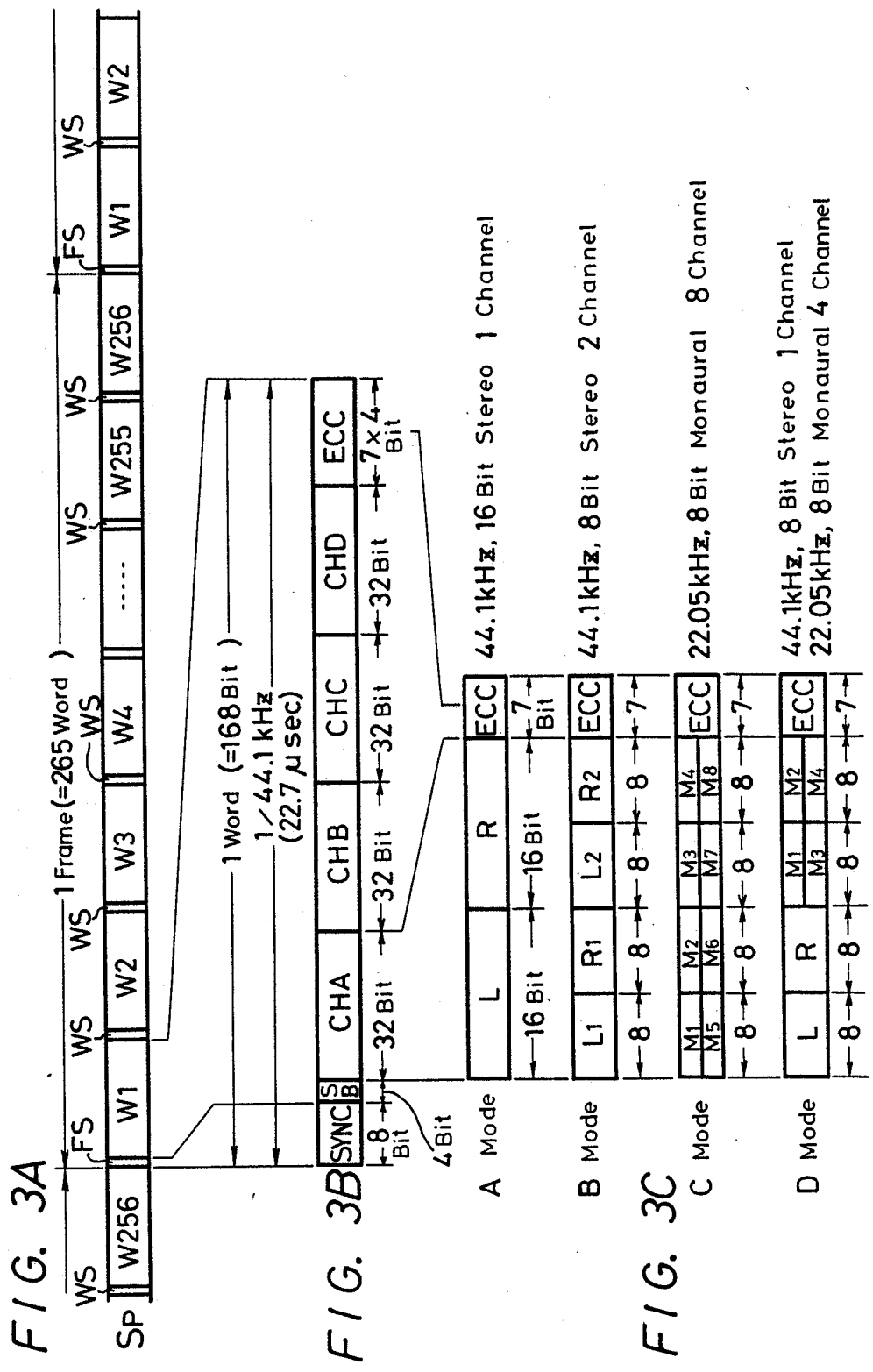

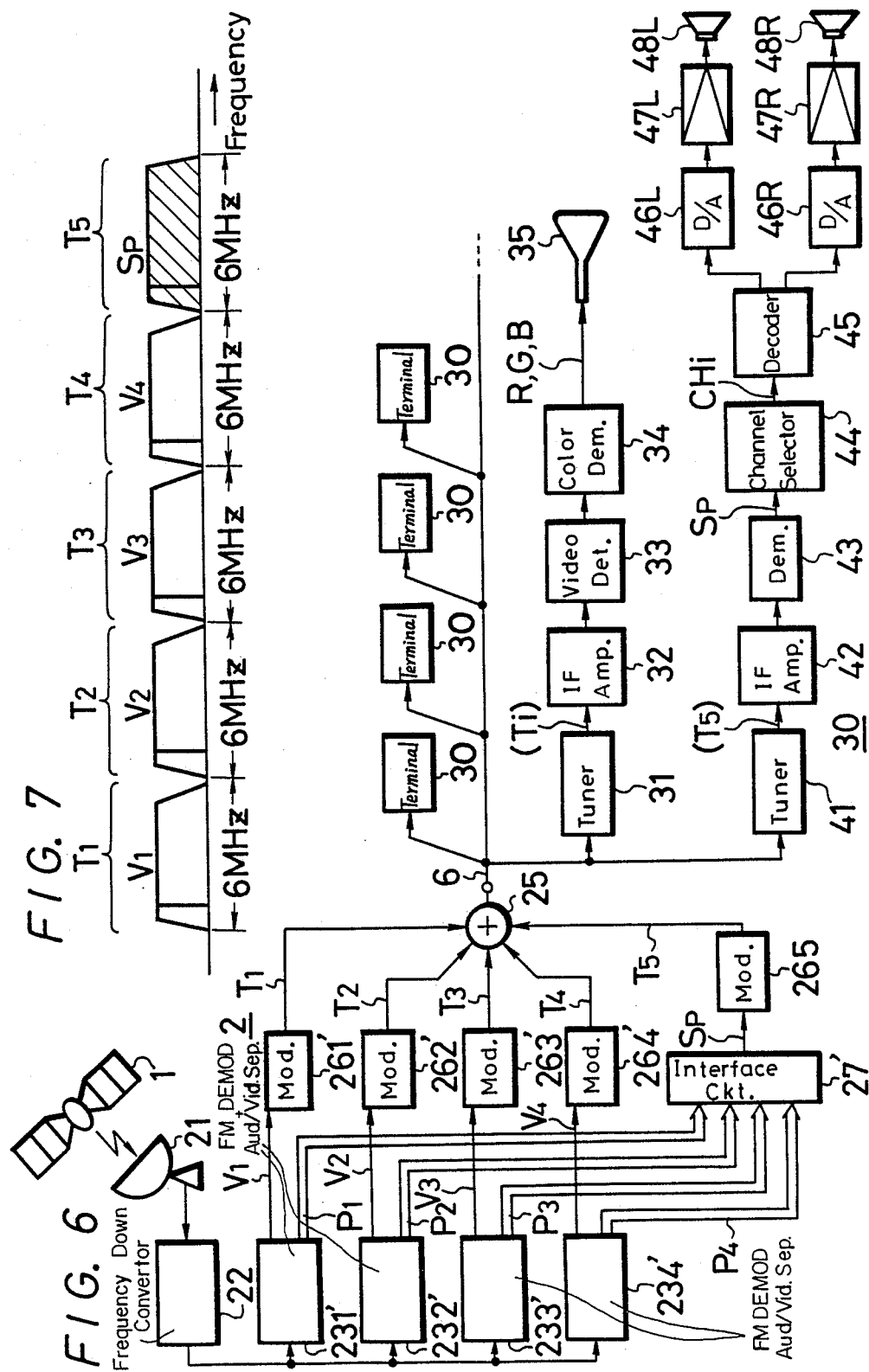

divided by (1) 4,805,014

SIGNAL TRANSMISSION SYSTEM FOR A CATV SYSTEM

This is a continuation of application Ser. No. 667,737, filed Nov. 2, 1984, now abandoned.

BACKGROUND OF THE INVENTION

1. Field of the Invention

This invention is related to a CATV (cable television) system and, in particular, is directed to a system that acts as an interface between a broadcast satellite system and the CATV system.

2. Description of the Prior Art

When a broadcast satellite system and a prior art CATV system are combined with each other, the combination can be as shown in FIG. 1.

In FIG. 1, reference numeral 1 designates a broadcast satellite (BS), 2 a CATV center, 3 a terminal (terminal receiver) installed at each user's home and 6 a coaxial cable. When a radio wave of, for example, 4 channels (in Japan, a radio wave of 8 channels is permitted at maximum) is transmitted from the broadcast satellite 1, this radio wave is received by a parabolic antenna 21. The radio wave or signal received by the parabolic antenna 21 is frequency-converted to an intermediate frequency signal by an outdoor unit 22 (including a BS (broadcast satellite) converter which frequency-converts a signal of super high frequency of 12 GHz to that of 1 GHz, which is disposed behind the parabolic antenna 21. The intermediate frequency signal thus frequency-converted is supplied through a coaxial cable to four indoor units 231 to 234 in which it is FM (frequency-modulation) -demodulated. Thereafter, video signals $V_1$ to $V_4$ are respectively demodulated from base band signals of the respective channels and the corresponding audio signals $S_1$ to $S_4$ are respectively demodulated from the PSK-modulated signals (phase shift keying modulated signals). These video signals $V_1$ to $V_4$ and audio signals $S_1$ to $S_4$ are respectively supplied to modulators 241 to 244, in which they are modulatd to television signals $T_1$ to $T_4$ as shown in FIG. 2 the (in FIG. 2, respective channels corresponding to television signals T1–T4 are shown adjoining to one another for simplicity). Thus, the video and audio signals are modulated to conventional television channel frequencies. The television signals $T_1$ to $T_4$ are delivered through a mixing circuit 25 to the coaxial cable 6. Accordingly, at the terminal 3, it is possible to view a television program of an arbitrary channel of the broadcast satellite.

Furthermore, in this kind of broadcast satellite system, the audio signals $S_1$ to $S_4$ are modulated in the form of PCM )pulse code modulated) digital signals and PSK-modulated on an audio sub-carrier of 5.727272 MHz and then respectively transmitted from the broadcast satellite 1. And in the indoor units 231 to 234, the PCM signals are respectively decoded to the audio signals $S_1$ to $S_4$. In other words, up to the indoor units 231 to 234, each of the audio signals $S_1$ to $S_4$ is of extremely superior quality whose band width is 20 kHz and whose dynamic range is wide.

However, at the stage when the audio signals $S_1$ to $S_4$ are delivered to the coaxial cable 6, the audio signals $S_1$ to $S_4$ are respectively modulated to the same FM signals as those used in the ordinary television broadcasting. Also, as shown in FIG. 2, the audio signals $S_1$ to $S_4$ are multiplexed with the video signals $V_1$ to $V_4$ in frequency-divided manner so that the tone quality presented by the PCM digital signal is deteriorated relative to that which is available from satellite 1.

OBJECTS AND SUMMARY OF THE INVENTION

Accordingly, it is an object of this invention to provide a CATV (cable television) system which can remove the above shortcomings.

It is another object of this invention to provide a CATV system which can realize an interface with a DBS (direct broadcast satellite) by demodulating a PCM (pulse code modulated) signal transmitted from a broadcast satellite and converting it into a digital signal suitable for a CATV transmission line.

It is a further object of this invention to provide a CATV system in which a PCM signal transmitted from a broadcast satellite is demodulated and the demodulated digital audio signal is transmitted through a channel which is different from a channel of a video signal of the CATV system.

According to one aspect of this invention, there is provided a CATV signal transmitting system comprising:

(a) receiving means for receiving a broadcast satellite signal consisting of a base-band video signal and a sub-channel digital audio signal modulated on a sub-carrier;

(b) demodulating means for deriving the video signal and digital audio signal, respectively, from the broadcast satellite station signal;

(c) first modulating means for modulating a main carrier of one of a plurality of CATV channels by said video signal as a base-band signal;

(d) second modulating means for modulating a main carrier of the other one of the plurality of CATV channels by said digital audio signal; and (e) means for mixing the output signals of said first and second modulating means and for transmitting the mixed signals through a CATV transmission line.

According to another aspect of this invention, there is provided a CATV signal receiving system comprising:

(a) a first tuning stage connected to a CATV transmission line for tuning one channel of a plurality of CATV channels, a main carrier of which is modulated by a base-band video signal;

(b) a second tuning stage connected to said CATV transmission line for tuning the other one channel of the plurality of CATV channels, a main carrier of which is modulated by said digital audio signal;

(c) video detecting means connected to said first tuning stage for producing the video signal to be supplied to a display device; and (d) demodulating means connected to said second tuning stage for producing the digital audio signal to be converted into an analog audio signal.

According to a further aspect of this invention, there is provided a CATV signal transmitting system comprising:

(a) receiving means for receiving a plurality of broadcast satellite channel signals, each consisting of a base-band video signal and a sub-channel digital audio signal modulated on a sub-carrier;

(b) means for demodulating a plurality of channels of video signals and a plurality of channels of digital audio signals;

(c) first means for modulating main carriers of a plurality of CATV channels by the plurality of channels of video signals; respectively;

(d) second means for modulating a selected one main carrier of a plurality of CATV channels by the plurality of channels of digital audio signals; and (e) means for combining the output signals of said first and second modulating means and for transmitting the combined signal through a CATV transmission line.

The other objects, features and advantages of the present invention will become apparent from the following description taken in conjunction with the accompanying drawings throughout which like references designate the same elements and parts.

BRIEF DESCRIPTION OF THE DRAWINGS

FIG. 1 is a circuit block diagram showing a currently proposed system in which video and audio signals transmitted from a broadcast satellite station are respectively demodulated and then transmitted through a CATV transmission line;

FIG. 2 is a waveform diagram showing a signal system which is used in the system shown in FIG. 1;

FIGS. 3A to 3C are respectively signal format diagrams of digital signals used in a CATV system according to this invention;

FIG. 6 is a circuit block diagram showing another embodiment of the CATV system according to this invention; and FIG. 7 is a diagram showing a transmission channel distribution used in the CATV system of the invention shown in FIG. 6.

DESCRIPTION OF THE PREFERRED EMBODIMENTS

Figures 4, 5:
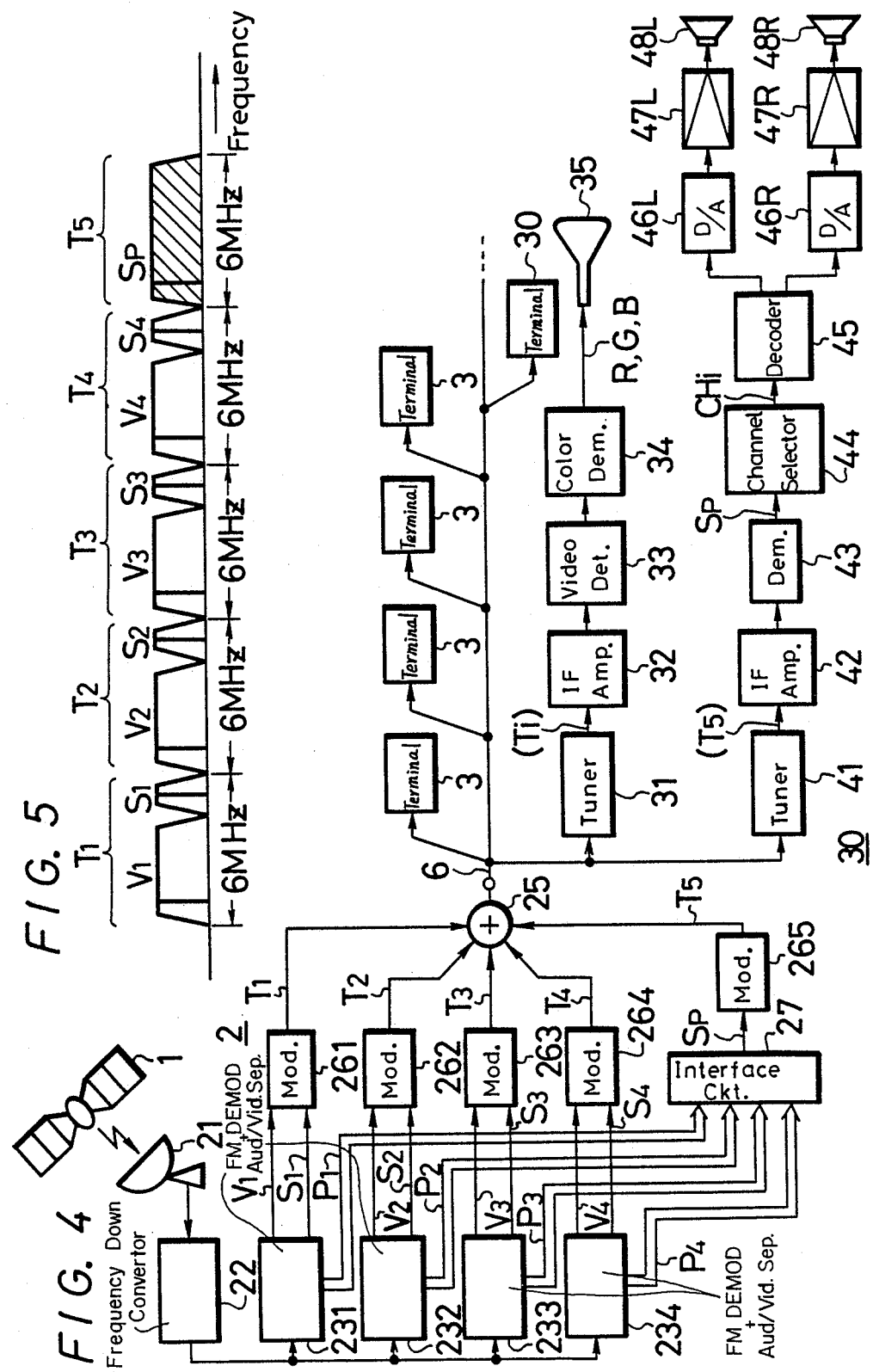
FIG. 4 is a circuit block diagram showing an embodiment of the CATV system according to this invention.
FIG. 5 is a diagram showing a transmission channel distribution used in the CATV system of the invention shown in FIG. 4.

Now, the present invention will hereinafter be described with reference to the drawings.

In this invention, the video signals are transmitted as explained in connection with FIG. 1, while the audio signals are converted to PCM signals having signal formats as shown in FIGS. 3A to 3C and then transmitted to a different channel.

As shown in FIG. 3A, this PCM signal is a binary signal having a large number of frames and each frame thereof is formed of 256 words, W1 to W256. One word thereof is formed of 168 bits and the cycle or period thereof is 1/44.1 kHz (22.7 $\mu$sec) as shown in FIG. 3B. In each word, a work synchronizing code SYNC of 8 bits, a service bit SB of 4 bits, four segments of data bits CHA to CHD of 32 bits each and four segments of error correction code ECC of 7 bits each are multiplexed with one another in time-division manner.

In this case, as shown in FIG. 3A, the word synchronizing code SYNC is formed as a frame synchronizing code FS in the first word W1 of the frame and as a word synchronizing code WS in the other 255 words, W2 to W256. In order to determine the location in the frame the bit pattern of the word synchronizing code WS is made different from that of the frame synchronizing code FS.

The service bit SB provides information by taking a number of bits of one frame, namely, 4×256=1024 bits as one unit and indicates an address signal for each terminal 3 and the content of service (permission for listening to pay channel audio broadcasting) for the terminal 3. Also, the service bit code SB can be used as a mode switching signal which indicates the kind of a digital signal to be transmitted. As a result, on the basis of such mode switching signal, in case of particular pattern, the PCM signal broadcast from the broadcast satellite is transmitted to the CATV transmission line and the particular pattern is identified on the receiving side, in order to put the television receiver into the correct operative mode.

Further, the data segments CHA to CHD that make up one word are each formed of 32 bits and comprise four independent channels CHA to CHD. Each of the channels CHA to CHD can adopt any one of the various modes A to D which are shown in FIG. 3C.

In the mode A, left and right channel stereo audio signals L and R are sampled by a sampling frequency of 44.1 kHz and encoded to PCM signals of 16 bits each. The signal format of these PCM signals is the same signal format of DAD (digital audio disc) in a so-called CD (compact disc) system. Accordingly, the mode A can provide the stereo audio signal of extremely high quality.

In the mode B, two pairs of stereo signals $L_1$, $R_1$ and $L_2$, $R_2$ are respectively sampled by the frequency of 44.1 kHz and then encoded to PCM signals of 8 bits, respectively. In the mode B, the noise reduction is carried out by signal-expanding and signal compressing the audio signals $L_1$ to $R_2$, too. Consequently, in accordance with the mode B, it is possible to provide the stereo broadcasting of high quality in two different channels.

In the mode C, monaural signals forming $M_1$ to $M_8$ channels are sampled by a frequency of 22.05 kHz and then respectively encoded to PCM signals of 8 bits. In this case, in accordance with the use, some of the monaural signals $M_1$ to $M_8$ are used for facsimile and the like. Thus, in this mode C, it is possible to realize services such as news, weather forecast, emergency broadcasting, facsimile and so on.

Further, in the mode D, the mode B and the mode C are combined with each other so as to realize one channel so that this mode D can cope with more elaborate service.

The modes A to D and the channels CHA to CHD can freely be combined with one another.

7 bits each of the error correction code ECC are used to carry out the error correction of the channels CHA to CHD. A BCH code, by way of example, can be used as the error correcting code (ECC) ECC.

The PCM signal Sp of FIG. 3A with the signal format as described above has a transmission bit rate as given by $$168 \text{ bits} \times 44.1 \text{ kHz} \approx 7.4 \text{ Mb/s}$$

Thus, the PCM signal Sp can be transmitted by using the frequency band of 6 MHz which is the frequency band of one channel in television broadcasting.

FIG. 4 schematically illustrates an embodiment of the CATV system according to the present invention, in which a radio wave of four channels from the broadcast satellite 1 is received and then transmitted to each terminal 3. In FIG. 4, like parts corresponding to those in FIG. 1 are marked with the same references and will not be described in detail.

As shown in FIG. 4, in the CATV center 2, the video signals $V_1$ to $V_4$ and the audio signals $S_1$ to $S_4$ derived from the demodulator and separator units 231 to 234 are respectively supplied to modulators 261 to 264, in which they are modulated to the television signals $T_1$ to $T_4$, each of which has a different channel as, for example, shown in FIG. 5. These television signals $T_1$ to $T_4$ are fed to the mixing circuit 25.

From the units 231 to 234, and derived PCM audio signals, namely, audio signals $P_1$ to $P_4$ which were subjected to error correction processing but not to D/A (digital-to-analog)-conversion. These signals $P_1$ to $P_4$ are respectively supplied to an interface circuit 27 and then converted to the PCM signals $S_p$ which were described in connection with FIG. 3. In this case, the signals $P_1$ to $P_4$ are respectively assigned to the channels CHA to CHD and every channel is set in the mode A.

Then, this PCM signal Sp is supplied to a VSB (vestigial side band) modulator 265 and thereby modulated to a VSB signal $T_5$ of the same system as that of the modulated signal when the video carrier wave is modulated by the video signal in the current television broadcasting. This signal $T_5$ is supplied to the mixing circuit 25. From the mixing circuit 25, a signal which results from mixing the signals $T_1$ to $T_5$ is sent to the coaxial cable 6.

While, in a terminal 30, the signal from the cable 6 is supplied to a tuner 31, in which a television signal Ti (i is an integer from 1 to 4) of a desired channel is frequency-converted to a video intermediate frequency signal. This video intermediate frequency signal Ti is supplied through a video intermediate frequency amplifier 32 to a video detector 33, in which the video intermediate frequency signal is demodulated to a video signal. This video signal is supplied to a color demodulator 34 thereby demodulated to three primary color signals R, G and B. These three primary color signals R, G and B are respectively supplied to a color cathode ray tube 35 in which a color signal is reproduced.

Further, the signal from the coaxial cable 6 is supplied to a front end (tuner circuit) 41, in which the signal $T_5$ is frequency-converted to an intermediate frequency signal. This signal is supplied through an intermediate frequency amplifier 42 to a demodulator 43, in which it is demodulated to the PCM signal Sp. This PCM signal Sp is supplied to a channel selector 44 from which the digital data of the channel CHi corresponding to the channel (signal Ti) which was selected from the channels CHA to CHD in the tuner 31 is derived. This digital data is supplied to a decoder 45, in which it is subjected to error correction. Thereafter, this digital data is supplied to D/A converters 46L and 46R from which the original audio signals L and R are derived. These audio signals L and R are supplied through amplifiers 47L and 47R to speakers 48L and 48R thereby played back in stereo mode.

While, at the general terminal 3, the image and sound are reproduced from the signals $T_1$ to $T_4$.

Another embodiment of the CATV system according to this invention will be described with reference to FIG. 6. In the embodiment shown in FIG. 6, like circuit elements corresponding to those in FIG. 4 are marked with the same references and will not be described in detail. In this embodiment, the radio wave of 4 channels is received from the broadcast satellite 1 and the video signal and the audio signal are respectively transmitted through independent channels to each terminal 30.

In FIG. 6, in the CATV center 2, the video signals $V_1$ to $V_4$ from demodulator and separator units 231' to 234' are respectively supplied to VSB modulators 261' to 264', in which they are modulated to the television signals $T_1$ to $T_4$ of wide frequency band, each having a different channel as, for example, shown in FIG. 7. However, these television signals $T_1$ to $T_4$ have no audio signals $S_1$ to $S_4$, as shown in FIG. 5. These television signals $T_1$ to $T_4$ are respectively, supplied to the mixing circuit 25.

Further, derived from the indoor units 231' to 234' are the PCM audio signals, namely, digital audio signals $P_1$ to $P_4$ which are not yet subjected to D/A-conversion. These digital audio signals $P_1$ to $P_4$ are respectively supplied to an interface circuit 27' thereby converted to the PCM signal Sp which was explained in connection with FIG. 3. In this case, the signals $P_1$ to $P_4$ are respectively assigned to the channels CHA to CHD and any one of the channels CHA to CHD is set in the mode A of 16 bits with the sampling frequency of 44.1 kHz.

This PCM signal Sp is supplied to the VSB modulator 265 and thereby modulated to the VSB signal $T_5$ occupying a frequency band of 6 MHz, that is, signal $T_5$ has the same band width as the signal when the video carrier wave is modulated by the video signal in a regular television broadcast. This signal $T_5$ is also supplied to the mixing circuit 25 so that the mixed signal of the signals $T_1$ to $T_5$ is delivered from the mixing circuit 25 to the coaxial cable 6.

Further, in the terminal 30, the signal from the coaxial cable 6 is supplied to the tuner 31, in which the television signal Ti (i is an integer from any one of 1 to 4) of the desired channel is frequency-converted to the video intermediate frequency signal. This signal is supplied through the video intermediate frequency amplifier 32 to the video detector 33 in which it is demodulated to the video signal. This video signal is supplied to the color demodulator 34 and thereby demodulated to the three primary color signals R, G and B. These three primary color signals R, G and B are fed to the color cathode ray tube 35 on which a color picture image is reproduced.

The signal from the coaxial cable 6 is supplied to the front end (tuner circuit) 41, in which the signal $T_5$ is frequency-converted to the intermediate frequency signal. This signal is supplied through the intermediate frequency amplifier 42 to the demodulator 43 and thereby demodulated to the PCM signal Sp. This PCM signal Sp is supplied to the channel selector 44 which produces the digital audio signal of the channel CHi corresponding to the channel (signal Ti) selected from the channels CHA to CHD in the tuner 31. This digital audio signal is supplied to the decoder 45 and subjected to error correction.

Thereafter, this digital audio signal is supplied to the D/A converters 46L and 46R which then derive the original audio signals L and R. These audio signals L and R are respectively supplied through amplifiers 47L and 47R to the speakers 48L and 48R so as to carry out the playback in stereo mode.

As described above, according to this invention, the television broadcast sent through the broadcast satellite 1 can be viewed by the CATV system. In this case, particularly in accordance with this invention, since the audio signal which is transmitted from the satellite broadcast 1 in the form of the PCM signal is converted in signal format and then transmitted in the form of the PCM signal to each terminal 3, the tone quality thereof is never deteriorated and it is possible to reproduce sound of remarkably high quality.

In the CATV system shown in FIG. 1, when the television signals are assigned to the successive channels as shown in FIG. 2, the occupied-frequency bands of the audio signals $S_1$ to $S_4$ must be narrowed in order to alleviate the interference between the adjacent channels in the terminal 3, thus the stereo broadcasting being made impossible. Therefore, in practice, the television signals $T_1$ to $T_4$ are assigned to every other channel so that on the whole, thee wide frequency band must be provided. However, according to this invention, since the audio signals $S_1$ to $S_4$ are not contained in the television signals $T_1$ to $T_4$, the television signals $T_1$ to $T_5$ can be assigned to the consecutive channels as shown in FIG. 7 so that in spite of the television signals $T_5$, it is possible to narrow the necessary frequency band to, for example, 30 MHz on the whole.

If it is permitted to assign the television signals $T_1$ to $T_5$ to every other channel, the video signals $V_1$ to $V_4$ can occupy all the frequency bands of 6 MHz in each channel so that it is possible to transmit signals of higher quality as the video signals $V_1$ to $V_4$.

Further, since the television signals $T_1$ to $T_4$ have the ordinary format of the video and audio signals, it is possible to enjoy at the general terminal 3 the broadcast satellite television program in which the audio signal is not the PCM signal.

Furthermore, without modifying the existing CATV system particularly, it is possible to supply to each terminal 3 the picture image and sound of high quality by the broadcast satellite.

Since the signal format as shown in FIG. 3 is used to send other audio signal than that used in the broadcast satellite and information signal such as facsimile simultaneously, it is possible to provide a wide variety of services more elaborately.

Since the user at the terminal 30 receives the audio signal which is transmitted with the tone quality of the PCM signal, the user can enjoy a so-called Hi-Fi sound of extremely high quality.

Furthermore, in the embodiment shown in FIG. 6, the audio signal is transmitted through the different channel from that of the video signal and the audio frequency band within the television channel in the prior art can be assigned to the frequency band of the video signal so that the frequency band of the video signal can be made wider by that much, thus the picture image of high quality being transmitted. In addition, the CATV system of this invention can cope with the multichannel audio system of the broadcast satellite and so, this CATV system becomes the system which can cope with future development.

The above description is given of the preferred embodiments of the invention, but it will be apparent that many modifications and variations could be effected by one skilled in the art without departing from the spirit or scope of the novel concepts of the invention, so that the scope of the invention should be determined by the appended claims only.

We claim as our invention:

1. A CATV signal transmitting system comprising:
   (a) receiving means for receiving a plurality of broadcast satellite channel signals, each channel signal consisting of a base-band video signal modulated on a carrier and a subchannel digitally coded audio signal modulated on a sub-carrier;
   (b) means connected to said receiving means for demodulating a plurality of base-band video signals and a plurality of respective sub-channel digitally coded audio signals from said received plurality of channel signals;
   (c) first modulating means for modulating said plurality of base-band video signals for transmission in respective CATV channels;
   (d) interface means receiving the demodulated sub-channel digitally coded audio signals and arranging said sub-channel digitally coded audio signals so as to be time-division multiplexed into a multiplexed, digitally coded audio signal consisting of a plurality of frames, each frame including at least a portion of each of said demodulated digitally coded audio signals, and an error check code signal;
   (e) second modulating means for modulating said time-division multiplexed digitally coded audio signal from said interface means for transmission in a CATV channel other than said respective CATV channels; and
   (f) means for combining the output signals of said first and second modulating means and for transmitting the combined signals through a CATV transmission line;
   whereby said audio signals as transmitted through said CATV transmission line have a bandwidth and dynamic range that undergo substantially no deterioration.

2. A CATV signal transmitting system according to claim 1, in which said sub-channel digitally coded audio signals are PSK (phase-shift keying) modulated on the sub-carrier, respectively.

3. A CATV signal transmitting system comprising:
   (a) receiving means for receiving a plurality of broadcast satellite channel signals, each channel signal consisting of a base-band video signal modulated on a carrier and a sub-channel digital PCM audio signal modulated on a sub-carrier;
   (b) means connected to said receiving means for demodulating a plurality of base-band video signals and a respective plurality of corresponding sub-channel digital PCM audio signals from said received plurality of channel signals;
   (c) first means for modulating a plurality of main carriers of a larger plurality of predetermined CATV channels by respective ones of the plurality of demodulated video signals;
   (d) interface means having the plurality of demodulated sub-channel digital PCM audio signals fed thereto and arranging the demodulated sub-channel digital audio PCM signals into a time-division multiplexed output digital signal formed of a plurality of frames, each frame including at least a portion of each of said digital PCM audio signals, and an error code signal;
   (e) second means for modulating a main carrier of one of said predetermined CATV channels other than the ones thereof modulated by said first means for modulating by said time-division multiplexed output digital signal from said interface means; and
   (f) means for combining output signals of said first and second means for modulating and for transmitting the combined signal through a CATV transmission line;
   whereby said audio signals as transmitted through said CATV transmission line have a bandwidth and dynamic range that undergo substantially no deterioration.

4. A CATV signal transmitting system according to claim 3, in which each of said plurality of sub-channels of digital PCM audio signals is coded in 16 bit segments and sampled at a 44.1 kHz-sampling frequency.

5. A CATV signal transmitting system according to claim 3, in which said interface means forms said frames to further include a word synchronizing signal and a service bit signal.

6. A CATV signal transmitting system according to claim 5, in which said service bit signal is indicative of the transmitting mode of different kinds of digital signals at least including said digital audio signals.

* * * * *